US 8,228,797 B1
Jul. 24, 2012

(12) United States Patent
Utley et al.

(10) Patent No.: US 8,228,797 B1
(45) Date of Patent: Jul. 24, 2012

(54) SYSTEM AND METHOD FOR PROVIDING OPTIMUM BANDWIDTH UTILIZATION

(75) Inventors: Robert H. Utley, Plano, TX (US); Gary F. Chard, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 1391 days.

(21) Appl. No.: 09/871,269

(22) Filed: May 31, 2001

(51) Int. Cl.
*H04L 12/56* (2006.01)
*H04L 12/28* (2006.01)

(52) U.S. Cl. ........................ 370/235; 370/414
(58) Field of Classification Search .......... 370/412–420, 370/388, 389, 468, 395.1, 229–236.2, 237, 370/241.1, 395.7, 395.71, 395.72, 421–429; 709/225–227
See application file for complete search history.

(56) References Cited

U.S. PATENT DOCUMENTS

| | | | |
|---|---|---|---|
| 5,367,523 A | 11/1994 | Chang et al. | |
| 5,432,824 A | 7/1995 | Zheng et al. | |
| 5,528,591 A | 6/1996 | Lauer | |
| 5,689,506 A * | 11/1997 | Chiussi et al. | 370/388 |
| 5,737,313 A * | 4/1998 | Kolarov et al. | 370/234 |
| 5,790,770 A * | 8/1998 | McClure et al. | 709/231 |
| 5,838,677 A * | 11/1998 | Kozaki et al. | 370/389 |
| 6,002,667 A | 12/1999 | Manning et al. | |
| 6,018,515 A | 1/2000 | Sorber | |
| 6,118,761 A * | 9/2000 | Kalkunte et al. | 370/229 |
| 6,163,527 A | 12/2000 | Ester et al. | |
| 6,201,792 B1 | 3/2001 | Lahat | |
| 6,201,810 B1 * | 3/2001 | Masuda et al. | 370/395.32 |
| 6,208,619 B1 * | 3/2001 | Takeuchi | 370/229 |
| 6,324,165 B1 * | 11/2001 | Fan et al. | 370/232 |
| 6,408,005 B1 | 6/2002 | Fan et al. | |
| 6,542,507 B1 * | 4/2003 | Khacherian et al. | 370/395.43 |
| 6,594,234 B1 * | 7/2003 | Chard et al. | 370/236 |
| 6,636,510 B1 * | 10/2003 | Lee et al. | 370/390 |
| 6,657,962 B1 * | 12/2003 | Barri et al. | 370/235 |
| 6,661,788 B2 * | 12/2003 | Angle et al. | 370/390 |
| 6,680,910 B1 * | 1/2004 | Ni | 370/235 |
| 6,920,147 B2 * | 7/2005 | Wallner et al. | 370/416 |
| 6,973,032 B1 * | 12/2005 | Casley et al. | 370/230 |
| 6,980,511 B1 * | 12/2005 | Li et al. | 370/230 |
| 7,023,857 B1 * | 4/2006 | Chiussi et al. | 370/395.4 |
| 7,027,457 B1 * | 4/2006 | Chiussi et al. | 370/414 |
| 7,035,212 B1 * | 4/2006 | Mittal et al. | 370/230 |
| 7,072,295 B1 * | 7/2006 | Benson et al. | 370/230 |

(Continued)

OTHER PUBLICATIONS

H.T. Kung et al, "Credit Based Flow Control for ATM Networks", IEEE, 1995.*
HT. Kung, et al., Credit-Based Flow Control for ATM Networks; Credit Update Protocol, Adaptive Credit Allocation and StatisticalMultiplexing, Proceedings of ACM SIGCOMM '94 Symposium on Communications Architectures, Protocols and Applications, 1994. (14 pages).

(Continued)

*Primary Examiner* — Chi Pham
*Assistant Examiner* — Habte Mered
(74) *Attorney, Agent, or Firm* — Marc A. Hubbard; Gardere Wynne Sewell LLP

(57) ABSTRACT

A system and method for communicating the current congestion state of a destination virtual output queue to a plurality of source queues in order to allow the source queues to adjust their data rates in real time for each class of service is disclosed. The preferred embodiment method comprises tracking the amount of data for one or more classes of service entering and leaving at least one destination queue associated with an output port; determining the amount of available space in the destination queue; creating a message based at least in part on the determined amount of available space; and transmitting the created message to a plurality of source queues at least one of which is providing data to the destination queue.

35 Claims, 5 Drawing Sheets

U.S. PATENT DOCUMENTS

| | | | |
|---|---|---|---|
| 7,203,171 B1* | 4/2007 | Wright | 370/236.1 |
| 2002/0075883 A1* | 6/2002 | Dell et al. | 370/413 |
| 2002/0095498 A1* | 7/2002 | Chanda et al. | 709/225 |
| 2002/0107908 A1* | 8/2002 | Dharanikota | 709/203 |
| 2002/0176361 A1* | 11/2002 | Wu et al. | 370/231 |
| 2003/0021230 A1* | 1/2003 | Kuo et al. | 370/230 |
| 2003/0133406 A1* | 7/2003 | Fawaz et al. | 370/229 |
| 2003/0174701 A1* | 9/2003 | Angle et al. | 370/390 |
| 2004/0213251 A1* | 10/2004 | Tran et al. | 370/395.1 |

OTHER PUBLICATIONS

World Wide Web, http://www.cis.ohio-state.edu/.about.jain/cis788-97/virtual_lans/index. htm, Suba Varadarajan, "Virtual Local Area Networks", printed on Feb. 7, 2000, 12 pages.

World Wide Web, http://www.ietf.org/internet-drafts/draft-ietf-mpls-arch-07.txt, Eric C. Rosen, "Multiprotocol Label Switching Architucture", printed on Jan. 9, 2001, 55 pages.

World Wide Web, http://www.ietf.org/internet-drafts/ draft-ietf-mpls-generalized-rsvp-te-00Peter Ashwood-Smith, et al., "Generalized MPLS Signaling-RSVP-TE Extensions", printed on Jan. 9, 2001, 19 pages.

Yates, Jennifer, et al., "Reconfiguration in IP Over WDM Access Networks", AT&T Labs—Research, AT&T Shannon Laboratories, 4 pages, Mar. 2000.

Copyright 2000 by the Institute of Electrical and Electronics Engineers, Inc., "Local and Metropolitan Area Networks", IEEE Standard for Information technology, published Oct. 16, 2000, pp. 40-50.

H.T. Kung and Robert Morris; Credit-Based Flow Control for ATM Networks; appeared in IEEE Network Magazine, Mar. 1995 (11 pages).

* cited by examiner

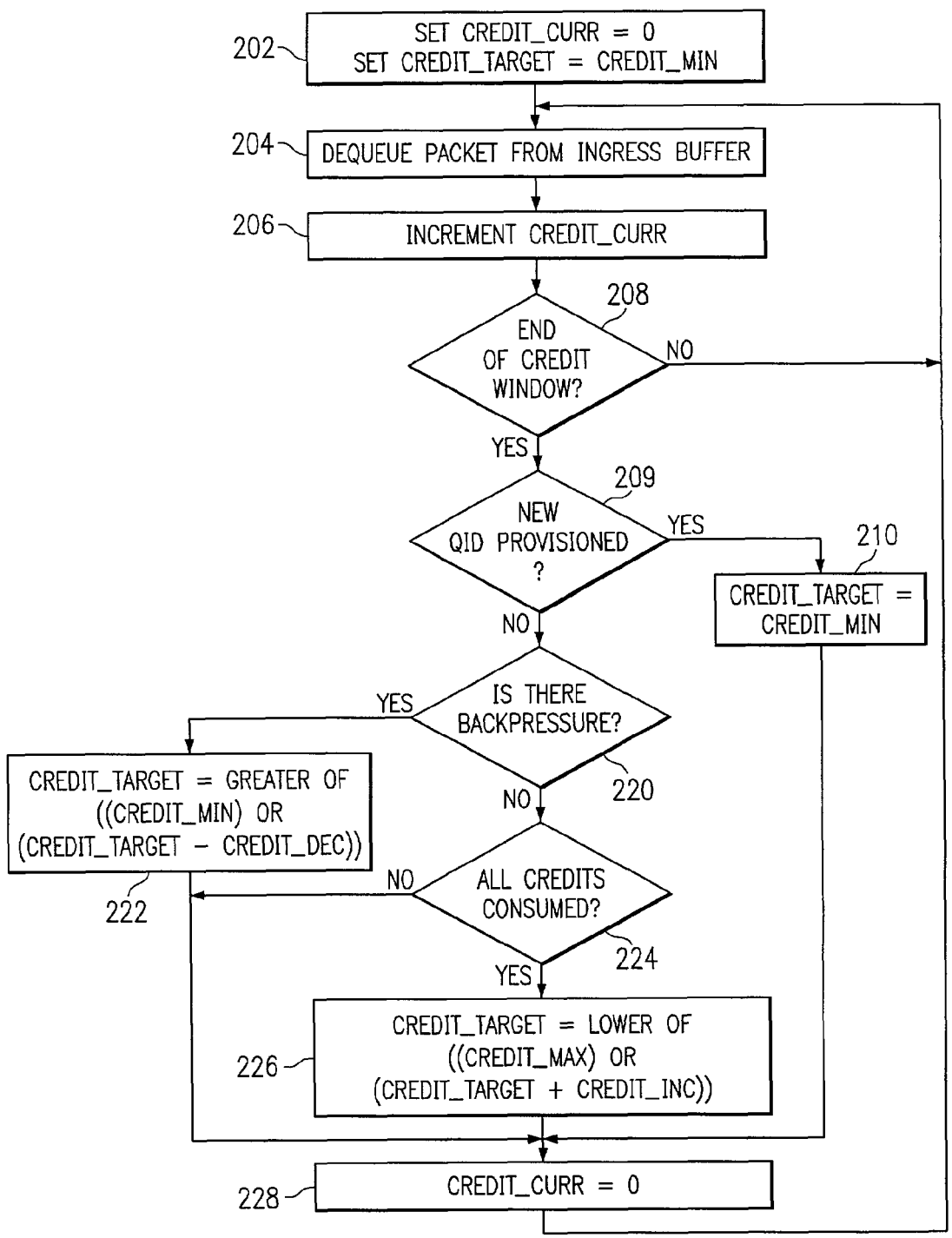

SYSTEM AND METHOD FOR PROVIDING OPTIMUM BANDWIDTH UTILIZATION

RELATED APPLICATIONS

The present patent application is related to concurrently filed U.S. patent application Ser. No. 09/871,034, entitled "SYSTEM AND METHOD FOR SCHEDULING TRAFFIC FOR DIFFERENT CLASSES OF SERVICE", the disclosure of which is incorporated herein by reference.

TECHNICAL FIELD OF THE INVENTION

The present invention relates generally to the field of telecommunications, and more particularly to a system and method for maintaining the quality of service while providing maximum bandwidth utilization.

BACKGROUND OF THE INVENTION

Traditional switching systems comprising of a switch core, a customer interface and a service provider interface provide static allocation of resources. Thus, when two or more sources desire to provide data to the same destination port while at the same time providing a particular Quality of Service (QoS) or class of service, the sources are set up so that the sum of the bandwidths allocated to different sources is less than or equal to the bandwidth of the destination port. However, if one of the sources is utilizing only a part of the bandwidth allocated to it, there is no robust mechanism for the other sources to adjust their bandwidths in real time so as to utilize the maximum bandwidth of the destination port. Thus, the destination port is not utilized to its maximum capacity even though some sources of data may be operating at a lower bandwidth and there might be data available at these sources to allow them to utilize the destination port up to its maximum capacity.

As an example, if the destination port has a bandwidth of 10 Gbps and two sources are sending data to the destination port, the first source can be set to send data at say 3 Gbps and the second source can be set to send data at 7 Gbps. However, if the second source is only sending data at 1 Gbps there is no robust mechanism to allow the first source to adjust its data rate even though the first source may be capable of sending data at a higher rate. Thus, the destination port remains underutilized.

SUMMARY OF THE INVENTION

Accordingly a system and method for communicating the current congestion state of a destination virtual output queue to the source queues in order to allow the source queues to adjust their data rates in real time for each class of service is disclosed.

The present invention contemplates adjusting the permissible bandwidth incrementally in order to avoid data loss. For example, if upon detection that one of the sources is utilizing only 1 Gbps of its allocated 7 Gbps bandwidth, the other source is allowed to increase its data rate from 3 Gbps to 9 Gbps and the first source is simultaneously allowed to make full use of its allocated 7 Gbps, the capacity of the destination port would be exceeded resulting in loss of data. Consequently, the QoS is not maintained even though the maximum available bandwidth is utilized. Incremental adjustment of the bandwidth over time eliminates this problem of data loss.

For example, one aspect of the invention includes a method, comprising tracking the amount of data for one or more classes of service entering and leaving at least one destination queue associated with an output port; determining the amount of available space in the destination queue; creating a message based at least in part on the determined amount of available space; and transmitting the created message to a plurality of source queues at least one of which is providing data to the destination queue.

Another aspect of the invention includes a system comprising means for tracking the amount of data for one or more classes of service entering and leaving at least one destination queue associated with an output port; means for determining the amount of available space in the destination queue; means for creating a message based at least in part on the determined amount of available space; and means for transmitting the created message to a plurality of traffic managers, wherein each of the plurality of traffic managers has at least one source queue providing data to the destination queue.

Other aspects and features of the invention will become apparent to those ordinarily skilled in the art upon review of the following description of specific embodiments of the invention in conjunction with the accompanying figures.

BRIEF DESCRIPTION OF THE DRAWINGS

For a more complete understanding of the present invention, the objects and advantages thereof, reference is now made to the following descriptions taken in connection with the accompanying drawings in which:

FIG. 2 is a flow diagram illustrating logic for a preferred embodiment method of the present invention for scheduling traffic to a destination traffic manager;

DETAILED DESCRIPTION OF THE DRAWINGS

The preferred embodiment of the present invention and its advantages are best understood by referring to FIGS. 1 through 9 of the drawings, like numerals being used for like and corresponding parts of the various drawings.

Figure 1:
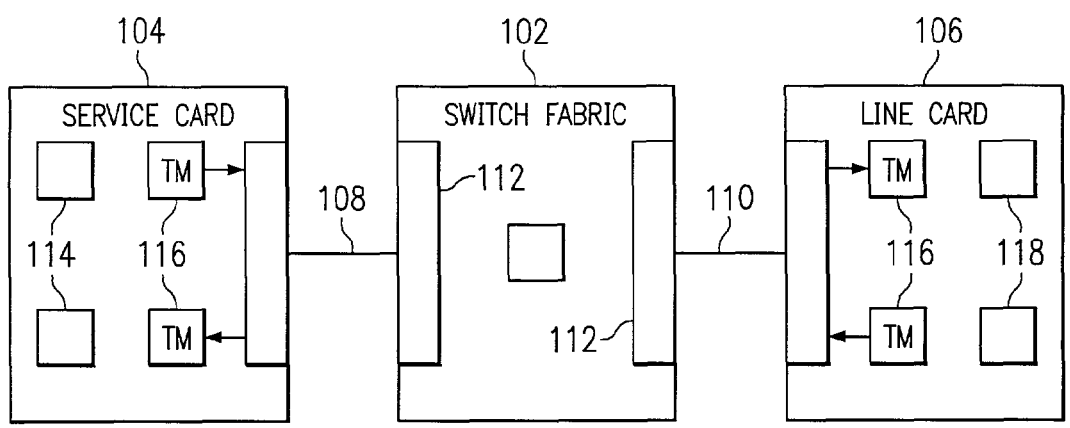
FIG. 1 is a block diagram of a preferred embodiment switching system utilizing the teachings of the present invention.

As shown in FIG. 1, the preferred embodiment switching system 100 comprises a switch fabric 102, a service card 104, and a line card 106. Switching system 100 is preferably part of an optical communications network. In an exemplary embodiment, switching system 100 comprises eight (8) service cards, two (2) switch fabric cards and two (2) line cards. Service card 104 and switch fabric 102 are coupled to each other via one or more high speed links 108. Similarly line card 106 and switch fabric 102 are coupled to each other via one or more high speed links 110.

Switch fabric 102 preferably includes an interface to line card 106 and an interface to service card 104. Preferably switch interface 112 is a VSC871 switch available from Vitesse Semiconductor, 741 Calle Plano, Camarillo, Calif. 93012. However, the invention is not so limited and may be used with other types of switch Cores.

Service card 104 includes one or more customer interfaces 114, such as one or more network processors, coupled to the customer site with a gigabit Ethernet. Service card 104 also includes one or more traffic managers 116. Traffic manager 116 includes a scheduler. Each service card 104 can be used for both traffic heading into switch fabric 102 (ingress traffic) and for traffic heading out of switch fabric 102 (egress traffic). The schedulers preferably schedule the flow of traffic, preferably in the form of packets, to and from switch fabric 102. Service card 104 preferably has two traffic managers—one for traffic heading into switch fabric 102 and the other for traffic heading out of switch fabric 102.

Line card 106 includes one or more service provider interfaces 118, such as one or more network processors, coupled to another network element. Line card 106 also includes one or more traffic managers 116. Traffic manager 116 includes a scheduler. Interface 118 is preferably a 10G packet over SONET interface. Each line card 106 can be used for both traffic heading into switch fabric 102 and for traffic heading out of switch fabric 102. The schedulers preferably schedule the flow of traffic, preferably in the form of packets, to and from switch fabric 102. Line card 106 preferably has two traffic managers—one for traffic heading into switch fabric 102 and the other for traffic heading out of switch fabric 102.

However, the invention is not so limited and if desired a single traffic manager on each card may be used for both ingress traffic and egress traffic.

The preferred embodiment scheduler can be utilized for scheduling traffic for a plurality of priority based classes of service. Preferably there are six classes of services with different priorities, for example, Fault Notification (FN), Expedited Forwarding (EF), Assured Forwarding 3 (AF3), Assured Forwarding 2 (AF2), Assured Forwarding 1 (AF1), and Best Effort (BE). Preferably the Fault Notification class of service has the highest priority and the Best Effort class of service has the lowest priority.

Each traffic manager has a memory element (not shown) associated with it for storing packets. The packets are stored in a plurality of virtual output queues (VOQ) in the memory element. Preferably the queues are FIFO. Each queue preferably has its own unique queue identification number (QID). The number of virtual output queues in each memory element may be calculated by multiplying the number of output ports by the number of classes of service. For example, the memory element associated with each ingress traffic manager having 76 ports and 6 classes of service would have (76*6=) 456 virtual output queues. On the other hand, the memory element associated with the egress traffic manager of a service card having 16 ports and 6 classes of service would have (16*6=) 96 queues. The memory element associated with the egress traffic manager of a line card having 4 ports and 6 classes of service would have (4*6=) 24 queues. Thus, the memory element associated with the egress traffic manager of line card 106 which preferably supports a quad port OC48 would have 24 queues. The number of queues supported by each traffic manager is scalable and may be more or less than the above mentioned number of queues depending on various factors, such as the number of ports on the cards, the number of classes of service supported and/or the like. The size of the memory associated with each traffic manager is also scalable.

The preferred embodiment scheduler uses a credit based system for packet scheduling. Credit based scheduling involves reserving scheduling bandwidth for the virtual output queues. For example in a preferred embodiment, the credit based system is utilized for the AF3, AF2, AF1, and BE traffic while a strict priority system is utilized for EF and FN traffic. Thus, the FN queue is scheduled next in line if at least one FN packet is available. If no FN packet is available, then the EF queue is scheduled if at least one EF packet is available. If neither FN nor EF traffic is available for scheduling, a queue from one of the AF3, AF2, AF1 or BE queues is scheduled based on the credit system.

Figure 3:
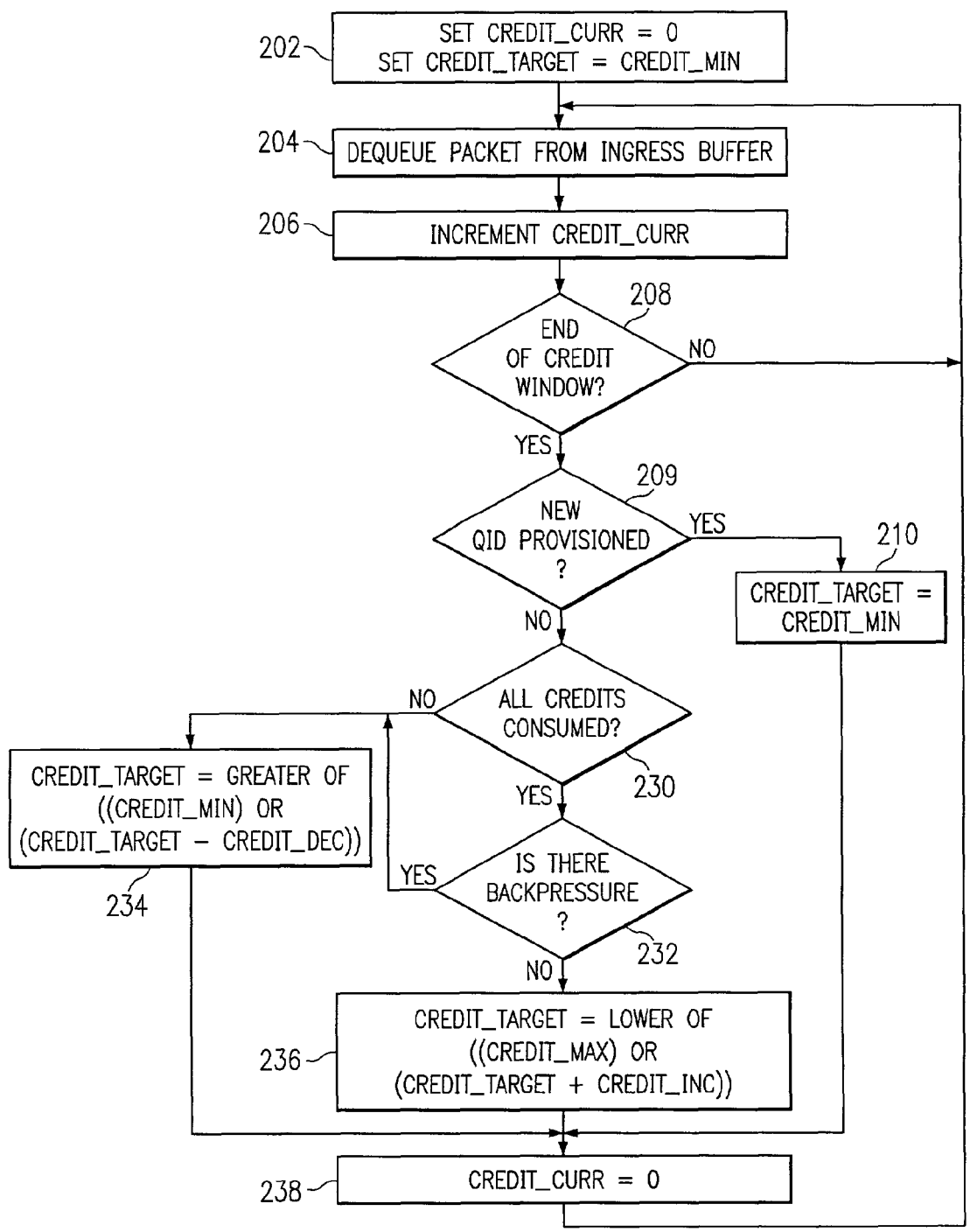
FIG. 3 is a flow diagram illustrating logic for an alternative embodiment method of the present invention for scheduling traffic to a destination traffic manager.

FIG. 2 is a flow diagram 200 illustrating logic for a preferred embodiment method for scheduling traffic to a destination traffic manager. FIG. 3 is a flow diagram 300 illustrating logic for an alternative embodiment method for scheduling traffic to a destination traffic manager. The flow diagram of FIG. 2 is preferably utilized by each of the schedulers for scheduling traffic to a destination traffic manager from each of the queues associated with the scheduler. If desired, the flow diagram of FIG. 3 may be used by one or more of the schedulers. The flow diagram of FIG. 2 or FIG. 3 is preferably used when steal mode is not enabled.

Initially various parameters for a selected plurality of source queues for a selected plurality of class of services is provisioned. Such parameters may be, for example, credit_min, credit_max, credit_inc, credit_dec, credit_curr, credit_target and/or the like. Preferably, the credit_min parameter is a provisioned minimum credit count for a particular queue; the credit_max parameter is a provisioned maximum credit count for a particular queue; the credit_inc is a global credit increment value; the credit_dec is a global credit decrement value; and the credit_target is the provisioned credit count for a particular queue for a current credit window.

The credit_min value for a queue is related to the bandwidth that the queue is guaranteed in any credit window. The credit_curr parameter tracks the amount of credit consumed by a queue during a credit window. The credit_max value for a queue is related to the maximum bandwidth that a particular queue can utilize during any credit window. The credit_target value for a queue is related to the amount of bandwidth allocated to a particular queue for the current credit window. The credit_inc value is related to the amount of bandwidth by which the credit_target value for one or more of the queues may be incremented preferably at the end of any credit window. The credit_dec value is related to the amount of bandwidth by which the credit_target value for one or more of the queues may be decremented preferably at the end of any credit window. Preferably the credit_inc and credit_dec values are global values. However, the invention is not so limited and if desired, different values may be used for one or more of the queues. For example, it may be advantageous in some cases to allocate a higher credit_inc value to certain queues depending on the class of service so that classes of service with higher priority have a higher value for credit_inc and classes of service with lower priority have a lower value for credit_inc.

The scheduler utilizes a provisionable credit window over which it allows a selected plurality of queues to send data to a destination resource. The portion of the credit window allocated to each queue is representative of the bandwidth allocated to the particular queue. The credit window may be a selected length of time, the occurrence of an event and/or the like. Preferably the credit window is a provisionable length of time. The provisionable value of the credit window is preferably set sufficiently large so as to allow fine tuned bandwidth values to be allocated to each queue. In general, the bandwidth associated with the sum of all credit_min values headed towards a particular destination resource, for example a destination port, should not exceed the capacity, for example the line rate of that particular destination resource. This allows all ingress schedulers to start operating their associated source queues at their respective credit_min values, which allows every source queue at least its fair share of the egress line bandwidth. For example, if three queues each require at least 1 Gbps of a 10 Gbps channel and if 1,000,000 credits is equivalent to 10 Gbps, provisioning 100,000 credits per credit window ($1/10^{th}$ of the total transmission time) as the credit_min value for each of the queues will allow each of the queues to receive at least 1 Gbps of bandwidth on that channel.

As shown in FIG. 2, in step 202, credit_curr parameter associated with a queue is set equal to 0 and the credit_target parameter associated with a queue is set equal to the credit_min value for that queue. In step 204, a packet is dequeued from the queue. In step 206, the value of credit_curr is incremented. Preferably, the length of the packet is utilized to determine the amount by which the credit_curr value of the queue is incremented. A credit is equal to a predetermined number of bytes. Preferably a credit is equal to 4 bytes. Thus, a n byte long packet would cause the credit consumed value of the queue it came from to be incremented by n/x credits, where one credit is equal to x bytes. Accordingly, in step 206 the value of credit_curr is modified by using the following formula:

$$credit\_curr = credit\_curr + (n/x)$$

For example, if 1 credit is equal to 4 bytes and a 1518 byte packet is dequeued from a queue, then in step 206 the value of credit_curr is increased by ($1518/4=$) 380 credits. Preferably, the amount by which credit_curr is increased is rounded to the next integer value.

After a packet is dequeued from an ingress buffer and the credit_curr value updated, the status of the queue is updated as described in more detail with reference to FIG. 9. In step 208 a determination is made as to whether the credit window has expired. If the credit window has not expired then another packet is dequeued from the queue (step 204) and the process repeated until the credit window expires.

In step 209 a determination is made as to whether any new queue was provisioned during the credit window. If a new queue was provisioned then in step 210 the credit_target value is set to the credit_min value.

In step 220, the congestion state at the destination queue is determined. If the same destination queue is being used by a plurality of source queues, there might be contention for the destination queue resulting in congestion. Congestion at the destination queue results in backpressure.

In general, in the preferred embodiment, if there is backpressure, then the target value (credit_target) for the next credit window for the source queue is decremented preferably by credit_dec, regardless of the number of unused credits remaining for the source queue at the end of the credit window. However, in the preferred embodiment, the value of credit_target for any queue is not less than the credit_min for that queue. Thus, as shown in the logic diagram of FIG. 2, if there is backpressure, then in step 222, the value of credit_target for a queue is set to the greater of i) the credit_min value for that queue, or ii) the current credit_target value decremented by credit_dec.

In general, in the preferred embodiment, if there is no backpressure and a queue consumed all its credits, then the target value (credit_target) for the next credit window for the particular queue is incremented preferably by credit_inc. However, in the preferred embodiment, the value of credit_target for any queue is not more than the credit_max for that queue. Thus, as shown in the logic diagram of FIG. 2, if there is no backpressure, then in step 224 a determination is made as to whether the queue consumed all its credits in the credit window. The determination as to whether the queue consumed all its credits in the credit window may be made, for example, by comparing the credit_curr value with the credit_target value for the particular queue. If the credit_target value for the queue is greater than the credit_curr value then the queue was unable to consume all its credits in the credit window. If a queue consumed all its credit during the credit window, then in step 226 the value of credit_target for the queue is set to the lower of i) the credit_max value for that queue, or ii) the current credit_target value incremented by credit_inc.

In step 228, the credit_curr value for the queue is set equal to 0 and the process starting at step 204 is repeated for the next credit window.

Figure 8:
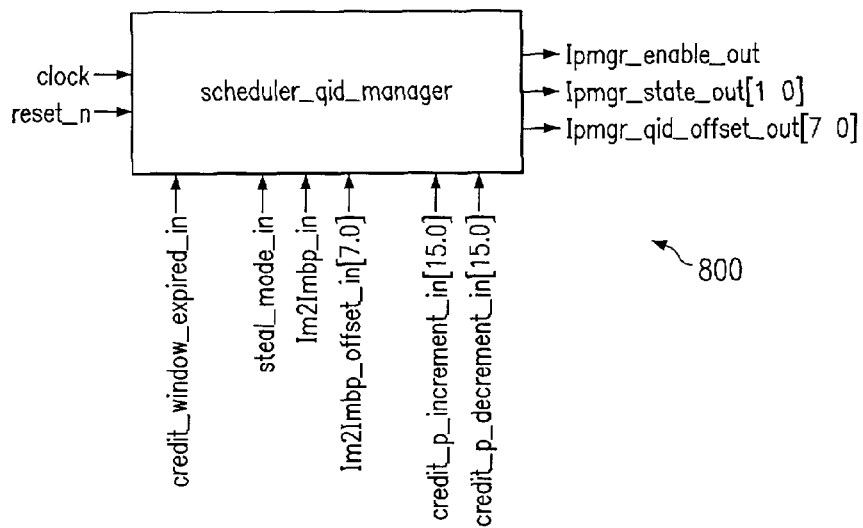
FIG. 8 is a block diagram of a scheduler manager.

When steal mode is enabled, as determined by checking the steal_mode_in bit as shown in FIG. 8, queues can share bandwidth on a resource, such as a port for example, up to the port's maximum line rate after all queues have utilized their available credit for the current credit window. In the steal mode, the credit allocated for a given queue for a credit window is not dependent upon what happened during the previous credit window. The amount of credit consumed by a queue does not exceed the queue's credit_min value until all enabled queues in a class of service have consumed their credit_min amount or are inactive. After each of the enabled queues have either consumed their credit_min amount during a particular credit window or are found to be inactive, a queue which still has data but is out of credits may transmit data. Preferably all the queues share the available bandwidth equally. Preferably, the actual credit used by a queue does not exceed the credit_max value for that queue.

FIG. 3 is a flow diagram 300 illustrating logic for an alternative embodiment method for scheduling traffic to a destination traffic manager. Steps 202 to 210 of the flowchart of FIG. 3 are substantially similar to the corresponding steps of the flowchart of FIG. 2. In step 230 a determination is made as to whether the queue consumed all its credits in the last credit window. In general, the target value (credit_target) for the next credit window for all queues that did not consume all their credits during the last credit window is decremented, preferably by the same amount, i.e. credit_dec, regardless of backpressure. However, the value of credit_target for any queue is not set to less than the credit_min value for that queue. Thus, as shown in the logic diagram of FIG. 3, if a queue did not consume all its credits during the last credit window, then in step 234, the value of credit_target for the queue is set to the greater of i) the credit_min value for that queue, or ii) the current credit_target value decremented by credit_dec.

In general, if a queue consumed all its credit and there is no backpressure, then the target value (credit_target) for the next credit window for that queue is incremented preferably by credit_inc. However, in the preferred embodiment, the value of credit_target for any queue is not more than the credit_max for that queue. Thus, as shown in the logic diagram of FIG. 3, if a particular queue consumed all its credits in the last credit window, then in step 232 a determination is made as to whether there is backpressure. If there is no backpressure, then in step 236, the value of credit_target for the queue is set to the lower of i) the credit_max value for that queue, or ii) the current credit_target value incremented by credit_inc.

If a queue consumed all its credit but there is back pressure, then in step 234, the value of credit_target for the queue is set to the greater of i) the credit_min value for that queue, or ii) the current credit_target value decremented by credit_dec.

In step 238, the credit_curr value for the queue is set equal to 0 and the process starting at step 204 is repeated for the next credit window.

In the preferred embodiment, in order to signal backpressure a single bit per output port per class of service is broadcast back to all source traffic managers thereby signaling that a queue at the output is becoming congested. Thus, for an interface with four ports and supporting six classes of service (4*6=) 24 bits could be used for signaling congestion. Preferably, a congestion is indicated by turning the corresponding bit to 1 and a lack of congestion is indicated by turning the corresponding bit to 0.

Figure 4:
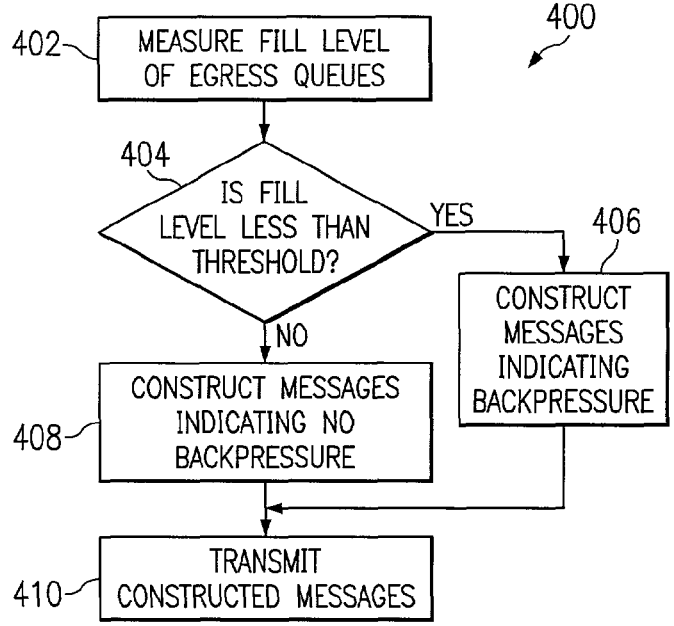
FIG. 4 is a flow diagram illustrating logic for a preferred embodiment method of the present invention for determining back pressure.

FIG. 4 is a flow diagram 400 illustrating logic for a preferred embodiment method of the present invention for determining back pressure. Preferably the logic of FIG. 4 is implemented at each traffic manager.

In step 402, the egress traffic manager measures the fill level of the egress queues for each class of service. Preferably the traffic manager calculates the fill level for each egress queue associated with the traffic manager or under the control of the traffic manager. Preferably this is done by keeping track of the amount of traffic that was inserted in a particular queue and the amount of traffic that was sent out of the queue. Thus, for example, if the maximum queue capacity is m bytes and n1 bytes entered the queue and n2 bytes were sent out of the queue, then the queue has m−(n1−n2) bytes remaining to be filled.

In step 404 a determination is made as to whether the fill levels for the egress queue is less than a threshold value. Preferably this is done for a queue every time a packet is inserted into the queue. Also preferably this determination is done by the traffic manager for each queue associated with it or under its control. In the preferred embodiment, the number of bytes remaining to be filled for each egress queue is at least the maximum packet size times the number of source queues providing packets to that particular egress queue for that QoS. This would ensure that the egress queue could handle all sources bursting the same QoS packet for the same output port at the same time. The threshold value is a provisionable value and signifies the number of bytes desired to be available above the minimum value. Preferably the threshold value is 32 kB. Thus, if $$\text{the number of bytes remaining} < \left( \begin{array}{c} \text{maximum packet size} * \\ \text{number of source queues} \end{array} \right) + \text{threshold value},$$

then in step 406 a message indicating backpressure is constructed for that particular queue.

On the other hand, if $$\text{the number of bytes remaining} \geq \left( \begin{array}{c} \text{maximum packet size} * \\ \text{number of source queues} \end{array} \right) + \text{threshold value},$$

then in step 408 a message indicating no backpressure is constructed for that particular queue.

Preferably the message for each queue includes the following fields: a QID offset and the status of the queue for each class of service. The QID offset field is preferably 8 bits long. A QID offset is used instead of the actual QID to reduce the number of bits of data that is transmitted to the other traffic managers. The QID for a particular queue can be determined by a traffic manager based on the QID offset and a base value associated with the sending traffic manager. The status field is preferably only a single bit for each class of service. Preferably, a value of 1 in the status field of a particular class of service indicates back pressure and a value of 0 indicates no backpressure for that particular class of service for that particular QID. Thus, for a queue with four classes of service (AF3, AF2, AF1, BE), the format of the message is preferably as shown below:

| Offset (8 bits) | AF3 bit | AF2 bit | AF1 bit | BE bit |
| --- | --- | --- | --- | --- |

However, the invention is not so limited. Fewer or greater number of bits can be used for the different fields depending on the different classes of service, the different queue status, and/or the like. Moreover, the codes for the queue status could be different.

In step 410, the constructed messages for the queues are transmitted to a plurality of traffic managers. Preferably, the messages are assembled into a single frame prior to transmission. The assembled frame is sent preferably to all the traffic managers in the switching system. If desired, the assembled frame may be sent only to a selected plurality of traffic managers, for example the traffic managers currently sending data to the particular egress traffic manager. Preferably the assembled frame is transmitted periodically, i.e. after the expiration of a period of time or upon the occurrence of certain events. Thus, although the status of the queues is updated in real time, for example when a packet is inserted into a queue, the assembled messages are transmitted to other traffic managers periodically. The advantage of such a method is that the overhead associated with the transmission and/or interpretation of the information is reduced.

Based on the received assembled frame, the traffic managers can determine the status of the egress queues for each port and for each class of service and accordingly adjust the data rates as discussed herein.

Figure 5:
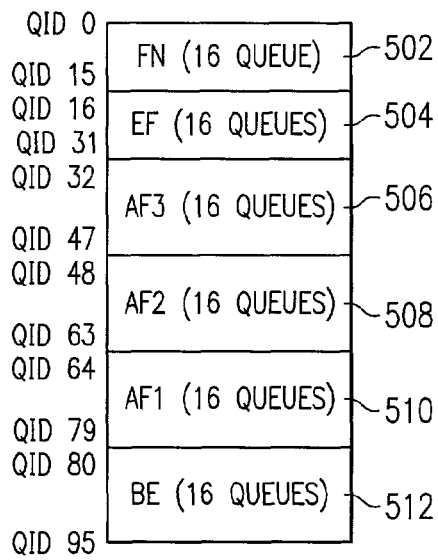
FIG. 5 is a block diagram of an exemplary egress queue structure utilized at the service card of the preferred embodiment switching system.

FIG. 5 is a block diagram of an exemplary egress queue structure 500 utilized at the service card of the preferred embodiment switching system. The number of queues is determined based at least in part on the number of classes of service and output ports a service egress traffic manager sends traffic to. Thus, oversubscription of a particular output port can be prevented so that the customer interface does not need to discard packets. The service egress traffic manager does not send more traffic to a port than it can handle. For example, it only sends a gigabit to each gigabit port with the proper allocation per class of service on those ports based on the minimum rate for egress for each QoS/port queue.

The total number of queues in the egress direction is equal to the number of ports times the number of QoS. For example, for a service card with 16 output ports with 6 classes of service, the number of queues is (16*6=) 96. Thus, as shown in FIG. 5, the exemplary queue structure comprises queues 502 with QID 0 to 15 for the FN class of service; queues 504 with QID 16 to 31 for the EF class of service; queues 506 with QID 32 to 47 for the AF3 class of service; queues 508 with QID 48 to 63 for the AF2 class of service; queues 510 with QID 64 to 79 for the AF1 class of service; and queues 512 with QID 80 to 95 for the BE class of service.

As an example, assume two customers A and B each egressing at the same switch on the same service card. Further assume that each customer has AF3 traffic egressing with the minimum rate for egress, for example, the egress committed rate (ECR) equal to 10 Mbps. Since each QoS for each port can have a different ECR, the scheduling is preferably done in a manner that meets the ECRs without wasting bandwidth. Further assume that the traffic manager has a total transmit rate of 8 Gbps out to the customer interface. Further assume that QID 32 and 33 are associated with customer A and QID 34 and 35 are associated with customer B. The credit window can be set to a multiple of the service egress traffic manager's transmit bandwidth, for example 800,000 credits. The credit_min value for each queue is set to 10 Mbps/8 Gbps*800,000 credits per credit window=1000 credits per credit window.

Additionally or alternatively the credit_max value for each queue can be assigned, if desired so that a maximum limit per queue is established. This allows the service provider to set a hard limit on the amount of traffic a customer can receive based on the level of service a customer has paid for.

Figure 6:
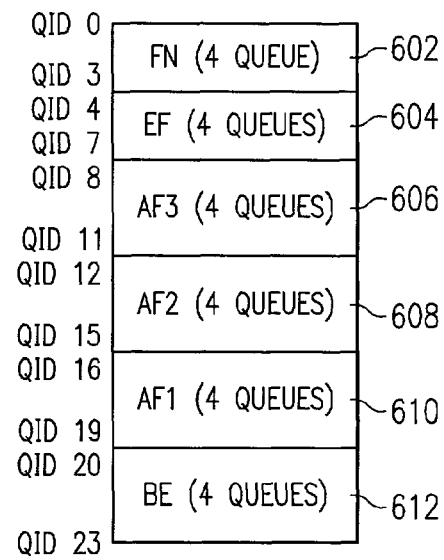
FIG. 6 is a block diagram of an exemplary egress queue structure utilized at the line card of the preferred embodiment switching system.

FIG. 6 is a block diagram of an exemplary egress queue structure 600 utilized at the line card of the preferred embodiment switching system. The number of queues is determined based at least in part on the number of classes of service and output ports a line egress traffic manager sends traffic to.

The total number of queues in the egress direction is equal to the number of ports times the number of QoS. For example, for a line card with 4 ports with 6 classes of service, the number of queues is (4*6=) 24. Thus, as shown in FIG. 6, the exemplary queue structure comprises queues 602 with QID 0 to 3 for the FN class of service; queues 604 with QID 4 to 7 for the EF class of service; queues 606 with QID 8 to 11 for the AF3 class of service; queues 608 with QID 12 to 15 for the AF2 class of service; queues 610 with QID 16 to 19 for the AF1 class of service; and queues 612 with QID 20 to 23 for the BE class of service.

As an example, assume two service provider interfaces A and B each egressing at the same switch on the same line card. Further assume, that each interface has both EF and AF2 traffic egressing. Further assume that QID 4 is associated with EF traffic for interface A; QID 5 is associated with EF traffic for interface B; QID 12 is associated with AF2 traffic for interface A; and QID 13 is associated with AF2 traffic for interface B. Further assume that for each interface both the AF2 traffic and the EF traffic egress with the minimum rate for egress equal to 1 Gbps.

Further, assume that the traffic manager has a total transmit rate of 10 Gbps out to the service provider interface. Since the credit amounts required for each customer is the same in this example, credit window resolution is not a big issue. The credit window can be set to a multiple of the service egress traffic manager's transmit bandwidth, for example 1,000,000 credits. Therefore, the credit_min value for each queue is set to 1 Gbps/10 Gbps*1,000,000 credits per credit window=100,000 credits per credit window.

Additionally or alternatively the credit_max value for each queue can be assigned, if desired so that a maximum limit per queue is established. This allows the service provider to set a hard limit per queue so that certain sources can only send certain amount of traffic based on the level of service a customer has paid for.

Figure 7:
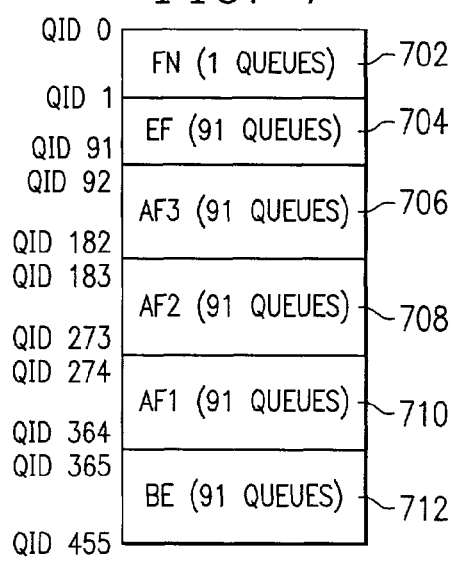
FIG. 7 is a block diagram of an exemplary ingress queue structure in a preferred embodiment switching system.

FIG. 7 is a block diagram of an exemplary ingress queue structure 700 in a preferred embodiment switching system. The switching system preferably comprises P number of service cards, Q number of access ring express cards, R number of access ring local cards, and S number of distribution ring cards. For example assume P=8, Q=16, R=2 and S=16. The total number of queues is thus equal to (5 classes of service*16 access line express cards*4 links/card)+(5 classes of service*2 access line local cards*1 link/card)+(5 classes of service*16 distribution ring cards*1 link/card)+(5 classes of service*8 service cards)+(6 classes of service*DPU)=456 queues.

Thus, there are 456 possible destinations to which an ingressing packet could be sent. For strict priority based class of service, for example the FN class of service, only a single queue is allocated. The remaining number of queues is divided, preferably equally among the other classes of service. Thus, as shown in FIG. 7, the exemplary queue structure comprises queue 702 with QID 0 for the FN class of service; queues 704 with QID 1 to 91 for the EF class of service; queues 706 with QID 92 to 182 for the AF3 class of service; queues 708 with QID 183 to 273 for the AF2 class of service; queues 710 with QID 274 to 364 for the AF1 class of service; and queues 712 with QID 365 to 453 for the BE class of service.

As an example, assume three customers A, B and C each ingressing at the same switch on the same service card. Further assume, that each customer is sending AF3 traffic with the minimum rate for ingress, for example, the ingress committed rate (ICR) equal to 10 Mbps and the maximum rate for ingress, for example, the ingress peak rate (IPR) equal to 20 Mbps. Further assume that based on the topology, customers A and B will be sending traffic to a 10G east local link and customer C will be sending traffic to the 10G west local link. Further assume that the traffic manager has a total transmit rate of 8 Gbps (number of network processors*the capacity of each network processor) into the switch fabric. Further assume that QID 32 is associated with the 10G east port and QID 33 is associated with the 10G west port. Since the credit amounts required for each customer is the same in this example, credit window resolution is not a big issue. The credit window can be set to a multiple of the service ingress traffic manager's transmit bandwidth, for example 800,000 credits.

Since customers A and B have the same class of service and are headed in the same direction each with an ingress committed rate of 10 Mbps, an ingress committed rate of 20 Mbps, i.e. the sum of the ingress committed rates for customers A and B, is to be converted to credits. Therefore, credit_min=20 Mbps/8 Gbps*800,000 credits per window=2000 credits per credit window for the ingress output queue for customers A and B. Similarly, an ingress peak rate of 40 Mbps, i.e. the sum of the ingress peak rates for customers A and B, is to be converted to credits. Therefore, credit_max=40 Mbps/8 Gbps*800,000 credits per window=4000 credits per credit window for the ingress output queue for customers A and B.

The credit_min for the output queue that contains customer C's traffic is set to credit_min=10 Mbps/8 Gbps*800,000=1000 credits per credit window. The credit_max for the output queue that contains customer C's traffic is set to credit_max=20 Mbps/8 Gbps*800,000=2000 credits per credit window.

The queue structure and provisioning as discussed above with regard to FIG. 7 can be used for scheduling traffic in the service ingress direction and also for scheduling traffic in the line ingress direction. In the line ingress direction, the traffic is being received by the traffic managers from a service provider interface instead of the customer interface.

FIG. 8 is a block diagram of a scheduler_qid_manager 800 ("manager"). Manager 800 is part of the scheduler and is preferably used to calculate credits. The manager may also be used to assign a state to each queue. Manager 800 has a plurality of incoming signals and a plurality of outgoing signals. Table I provides a summary of some of the different incoming signals going in and out of the manager in a preferred embodiment:

TABLE I

| Signal Name | I/O | Width | Signal Description |
| --- | --- | --- | --- |
| Credit_window_expired_In | I | 1 | This signal pulses high for one clock each time the credit window expires and indicates that the credit window has expired. |
| Steal_mode_in | I | 1 | This mode bit indicates whether the scheduler is operating in a steal mode or not. |
| Tm2tmbp_in | I | 1 | Indicates traffic-manager-to-traffic-manager back pressure when asserted for a given queue offset ID (tm2tmbp_offset in [7:0]). |
| Tm2tmbp_offset_in | I | 8 | Indicates which queue offset ID the tm2tmbp_in bit is valid for. |
| Credit_p_increment_in | I | 16 | Indicates the credit increment value. |
| Credit_p_decrement_in | I | 16 | Indicates the credit decrement value. |
| Lpmgr_enable_out | O | 1 | When asserted this bit indicates valid data on lpmgr_state_out and lpmgr_qid_offset_out |
| Lpmgr_state_out | O | 2 | This bus indicates the state of the queue id offset. Valid states are "00" for inactive, "01" for active, "10" for active_standby and "11" for disabled. |
| Lpmgr_qid_offset_out | O | 8 | This bus indicates the queue id offset associated with lpmgr_state_out |

Figure 9A:
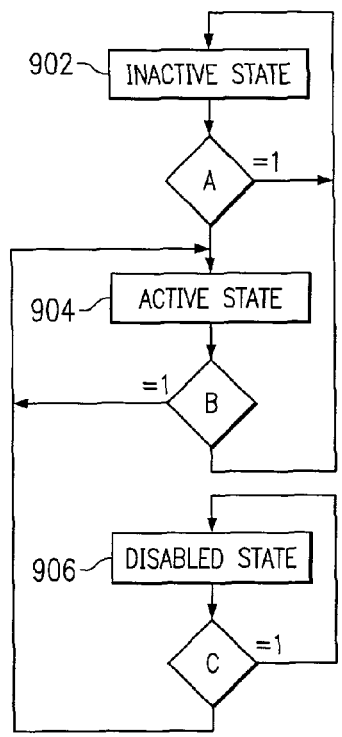
FIGS. 9A and 9B are preferred state diagrams for a queue.
Figure 9B:
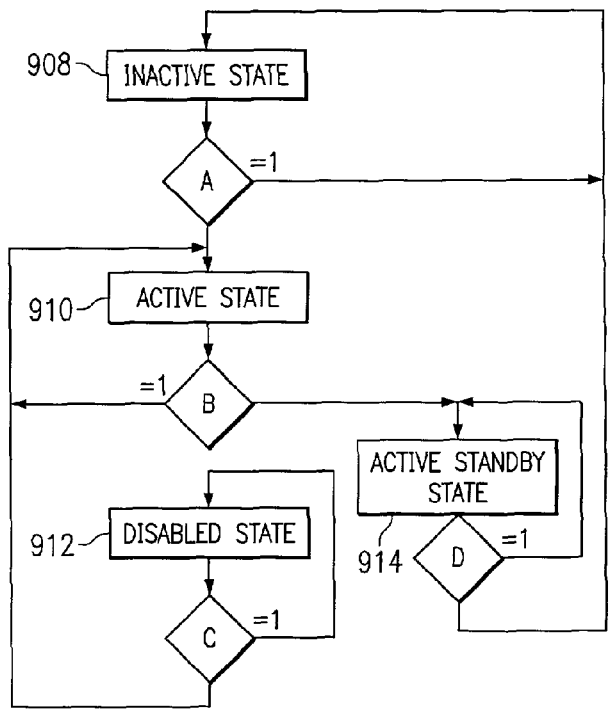

FIG. 9A is a preferred embodiment state diagram for a queue when the steal mode is disabled and FIG. 9B is a preferred embodiment state diagram for a queue when the steal mode is enabled. When the steal mode is disabled, each queue is assigned one of three states—active, inactive or disabled. When the steal mode is enabled, each queue is assigned one of four states—active, inactive, disabled, or active standby.

When a given queue has both data and credits, it is said to be in the active state; when steal mode is enabled and a given queue has data but no credits, it is said to be in the active_standby state; when a given queue is out of either data or credits, it is said to be in the inactive state; and when a given queue has its credit_min provisioned to zero, it is in the disabled mode.

Thus, as shown in FIG. 9A, when steal mode is disabled, a queue is in an inactive state 902 when either the credit_curr value of the queue is greater than or equal to the credit_target value of the queue or there are no packets in the queue, i.e. packet_count is equal to 0. A queue is in an active state 904 when the credit_curr value for the queue is less than the credit_target value of the queue and there are packets in the queue, i.e. packet_count is greater than 0. A queue is in a disabled state 906 when the credit_min value for the queue is 0.

Thus, when steal mode is disabled,
A=(credit_curr>=credit_target) OR (packet_count=0);
B=(credit_curr<credit_target) AND (packet_count>0); and
C=(credit_min=0).

As shown in FIG. 9B, when steal mode is enabled, a queue is in an inactive state 908 when either the credit_curr value of the queue is greater than or equal to the credit_max value of the queue or there are no packets in the queue, i.e. packet_count is equal to 0. A queue is in an active state 910 when the credit_curr value for the queue is less than the credit_min value of the queue and there are packets in the queue, i.e. packet_count is greater than 0. A queue is in a disabled state 912 when the credit_min value for the queue is 0. A queue is in an active standby state 914 when the credit_curr value of the queue is less than the credit_max value for the queue.

Thus, when steal mode is enabled,
A=(credit_curr>=credit_max) OR (packet_count=0);
B=(credit_curr<credit_min) AND (packet_count>0);
C=(credit_min=0); and
D=(credit_curr<credit_max).

One of the advantages of the present invention is that no external memory is necessary for storing the logic desirable to implement the preferred embodiment of the present invention. The logic can be stored on the traffic manager itself. Moreover, preferably the system is scalable so that data can be scheduled for a large number of queues. Furthermore, the credit based system allows fair sharing of bandwidth by the different queues because each queue is guaranteed at least its minimum credit during a credit window. On the other hand, because of the dynamic nature of allocation of bandwidth, very little bandwidth is wasted as the bandwidth of the queues can be adjusted based at least on the feedback from a shared resource.

The present invention can be used for both fixed sized packets, such as those that are used in ATM based communications, and/or variable sized packets, such as those that are used in IP based communications. This is possible because of the use of the credit based system which relates the credits to the size of the packet instead of the number of packets. Thus, the present invention is most advantageous in communications systems that utilize variable sized packets.

The present invention supports scheduling for different classes of service and for different drop priorities. Some of the classes of service such as AF3, AF2 and AF1, have different drop priorities within the class. Thus, for example, if there is contention for the excess bandwidth then a determination as to which subclass within a particular class wins the contention can be based on the drop priorities within the class.

Moreover, in the preferred embodiment the present invention does not use a typical ON/OFF backpressure, for example, if there is back pressure the queues do not stop sending data altogether. Instead the preferred embodiment allows linearly increasing or linearly decreasing bandwidth depending upon the availability of the desired resources.

While the invention has been particularly shown and described by the foregoing detailed description, it will be understood by those skilled in the art that various other changes in form and detail may be made without departing from the spirit and scope of the invention.

What is claimed is:

1. A method for controlling flow of data across a switch fabric within a communications node, the switch fabric interconnecting a plurality of ports, comprising:

tracking the amount of data for one or more classes of service entering and leaving a destination queue within this node associated with an output port;

determining the amount of available space in said destination queue;

creating a message based at least in part on said determined amount of available space;

transmitting said created message within the node, and not between nodes, to a plurality of source queues within the node on the opposite side of the switch fabric from the destination queue for buffering data received by the node for transmission through the switch fabric to the destination queue within the node; and for each of at least one of the plurality of source queues, incrementally adjusting bandwidth allocated to that source queue to transmit during a window in the future data through the switch fabric to the destination queue based at least in part in response to the message, a class of service associated with that source queue and on utilization of bandwidth allocated to that source queue during a preceding window for transmission.

2. The method of claim 1, wherein said determination of said available space is made when a packet of data enters said at least one destination queue.

3. The method of claim 1, wherein creating a message includes creating a message in response to a change in a status of the at least destination queue, and multiple messages are created.

4. A method, comprising:
tracking the amount of data for one or more classes of service entering and leaving at least one destination queue associated with an output port;
determining the amount of available space in said at least one destination queue;
creating a message based at least in part on said determined amount of available space; and
transmitting the message to a plurality of source queues at least one of which is providing data to said at least one destination queue;
wherein said amount of available space in said destination queue is equal to q bytes, wherein q=(m−(n1−n2)), wherein
m is the maximum capacity of said destination queue;
n1 is the number of bytes of data that entered said destination queue; and
n2 is the number of bytes of data leaving said destination queue;
and wherein a backpressure condition is indicated if q<((a maximum packet size*the number of said plurality of source queues providing data to said at least one destination queue)+a threshold value).

5. The method of claim 4, wherein a backpressure condition is not indicated if $$q>=((\text{a maximum packet size*the number of said plurality of source queues providing data to said at least one destination queue})+\text{a threshold value}).$$

6. The method of claim 4, wherein said threshold value is a provisionable value.

7. The method of claim 4, wherein said threshold value is at least 32 kb.

8. The method of claim 4, wherein said created message comprises a queue identification field and a status field for each of said plurality classes of service, wherein said status field for a class of service is ON when there is backpressure for said particular class of service and said status field is OFF when there is no backpressure for said particular class of service.

9. A method for controlling flow of packet data across a network switching node, comprising:
tracking the amount of data for a plurality of classes of service entering and leaving at least one destination queue associated with an output port;
determining the amount of available space in said at least one destination queue;
creating a message based at least in part on said determined amount of available space; and
transmitting said created message to a plurality of source queues within the switching node on a side of the switching node opposite the at least one destination queue, at least one of which is providing data to said at least one destination queue through the switching node;
wherein said created message comprises a queue identification field and a status field for each of said plurality of classes of service; and
wherein the length of said created message is equal to (k+number of said plurality of classes of service), wherein k is the length of said queue identification field.

10. The method of claim 9, wherein said queue identification field includes an offset value for said destination queue.

11. The method of claim 10, wherein said status field for each of said plurality of classes of service is 1 bit long.

12. The method of claim 9, wherein said queue identification field is 8 bits long.

13. A system for communicating a queue status, comprising:
means for tracking the amount of data for one or more classes of service entering and leaving at least one destination queue associated with an output port;
means for determining the amount of available space in said at least one destination queue;
means for creating a message based at least in part on said determined amount of available space; and
means for transmitting said created message to a plurality of traffic managers, wherein each of said plurality of traffic managers has at least one source queue providing data to said at least one destination queue;
wherein said amount of available space in said at least one destination queue is equal to q bytes, wherein q=(m−(n1−n2)), wherein
m is the maximum capacity of said destination queue;
n1 is the number of bytes of data that entered said destination queue; and
n2 is the number of bytes of data leaving said destination queue;
wherein a backpressure condition is indicated if q<((a maximum packet size times the number of source queues providing data to said at least one destination queue)+a threshold value); and a backpressure condition is not indicated if q>=((a maximum packet size times the number of source queues providing data to said at least one destination queue)+a threshold value).

14. The system of claim 13, wherein each of said plurality of traffic managers adjusts a data rate of said at least one source queue based at least in part on said backpressure condition at said at least one destination queue.

15. A system for communicating a queue status within a single communications node, the node including a switch fabric interconnecting a plurality of ports located at the same node, comprising:
means for tracking the amount of data for one or more classes of service entering and leaving at least one destination queue associated with one of the plurality of output ports;
means for determining the amount of available space in said at least one destination queue;
means for creating a message based at least in part on said determined amount of available space; and
means for transmitting said created message to a plurality of traffic managers, wherein each of said plurality of traffic managers has associated with it at least one source queue coupled with the switch fabric for transmitting, through the switch, data to said at least one destination queue;
wherein each of the plurality of traffic manages is adapted for incrementally adjusting bandwidth allocated for each one of the at least one source queue with which it is associated for a window in the future for transmitting data to the at least one destination queue through the switch fabric, the incremental adjustment based at least in part on the message, a class of service associated with the at least one source queue, and on utilization of bandwidth allocated to the one of at least one of the plurality of source queues during a preceding window.

16. The system of claim 15, wherein said determination of said available space is made when a packet of data enters said at least one destination queue.

17. In a node of a communications system, the node comprised of switch fabric interconnecting a plurality of ports, a method, comprising:
    determining the amount of available space for one or more classes of service in a destination queue associated with one of the plurality of ports;
    creating a message for said destination queue based at least in part on said determined amount of available space, wherein said message provides an indication of the amount of available space in the destination queue;
    transmitting said created message to a plurality of traffic managers, wherein each of said plurality of traffic managers has at least one source queue at the node from which data is being sent through the switch fabric to the destination queue; and
    for each of the at least one of source queues of each of the plurality of traffic managers, incrementally adjusting with its traffic manager the bandwidth allocated to that source queue by its traffic manager to provide data during a predetermined window in the future to the destination queue based on said created message, a class of service associated with that source queue, and utilization by that source queue of bandwidth allocated during a preceding window to that source queue.

18. A telecommunications node, comprising:
    switch fabric coupled with at least one egress port and at least one ingress port located at the same node, the at least one egress port having at least one destination queue for storing packets to be transmitted by the egress port, and the at least one ingress port having associated with it at least one source queue corresponding to the at least one of egress port for buffering packets received on the at least one ingress port prior for transmission by the switch fabric to the corresponding at least one destination queue;
    at least one ingress traffic manager for controlling at least transmission of packets from the at least one source queue; and
    at least one egress traffic manager for controlling at least the transmission of packets from the node through the at least one egress port, the at least one egress traffic manager generating a message indicating one of a fill level of or amount of space left in the at least one destination queue;
    wherein the ingress traffic manager comprises a scheduler for changing incrementally allocated bandwidth on a window by window basis to each of the at least one source queue for transmitting packets to the switch fabric for the at least one destination queue for which the message was generated based at least in part on the message, a class of service associated with the at least one source queue and utilization of by that source queue of bandwidth allocated to that source queue during a prior window.

19. The telecommunications node of claim 18, wherein the at least one source queue includes a plurality of source queues, each source queue being allocated a bandwidth for transmitting packets to the switch fabric, and wherein the scheduler dynamically reallocates bandwidth among two or more of plurality of queues based at least in part on the use of the bandwidth and the message.

20. The telecommunications node of claim 18, wherein the at least one source queue includes a plurality of source queues, each of the plurality of source queues being assigned a credit window, and wherein the scheduler dynamically reallocates credits between the plurality of source queues based at least in part in response to use of bandwidth by the plurality of queues and the message.

21. The telecommunications node of claim 18, wherein the created message includes an indication of one of the fill level or amount of empty space in the at least one destination queue relative to a predetermined threshold value.

22. The telecommunications node of claim 18, wherein the allocated bandwidth for the at least one source queue is not decreased below a predetermined minimum value.

23. The telecommunications node of claim 18, wherein the allocated bandwidth for the at least one source queue is not increased above a predetermined maximum value.

24. The telecommunications nodes of claim 18, wherein the at least one source queue includes a plurality of source queues, each corresponding to one of plurality of different classes of service for the egress port.

25. A network switching node, comprising:
    a switch fabric;
    at least one service card directly connected to said switch fabric wherein said service card has a customer network interface, at least one service card ingress queue through putting traffic from the customer network interface to said switch fabric, at least one service card egress queue through putting traffic from said switch fabric to the customer network interface, and at least one service card traffic manager for scheduling flow of traffic between said switch fabric and the customer network interface, and;
    at least one line card directly connected to said switch fabric wherein said line card has a service provider interface, at least one line card ingress queue through putting traffic from the service provider interface to said switch fabric, at least one line card egress queue through putting traffic from said switch fabric to the service provider interface, and at least one line card traffic manager for scheduling flow of traffic between said switch fabric and the service provider interface,
    wherein at least one of:
    (a) the service card traffic manager is adapted for creating a first backpressure message based at least in part on an amount of space available in the service card egress queue and sending the service card backpressure message to the line card traffic manager, the line card traffic manager, in response to the service card backpressure message and based on utilization of previously allocated bandwidth, being adapted for incrementally adjusting bandwidth allocated for transmitting data through said switch fabric from the line card ingress queue to the service card egress queue; or
    (b) the line card traffic manager is adapted for sending to the service card traffic manager a line card backpressure message based at least in part on an amount of space available in the line card egress queue, the service card traffic manager being adapted for, in response to the line card backpressure message and based on utilization by the service card ingress queue of bandwidth previously allocated to the service card ingress queue, and a class of service associated with the service card ingress queue, incrementally adjusting bandwidth allocated for transmitting data through said switch fabric from the service card ingress queue to the line card egress queue.

26. The network switching node of claim 25, wherein at least one of the service card traffic manager or the line card traffic manager schedules flow of traffic for at least two priority based classes of service each having an ingress queue and an egress queue, and is further adapted for incrementally adjusting bandwidths of the priority based classes of service individually while observing at least a minimum bandwidth requirement for each of the classes of service.

27. The network switching node of claim 25, wherein at least one of the service card traffic manager or the line card traffic manager schedules flow of traffic for at least two priority based classes of service each of which has an ingress queue and an egress queue, and is further adapted for adjusting bandwidth of a higher priority one of the classes of service while incrementally adjusting bandwidth of a lower priority one of the classes of service on a window by window basis.

28. The network switching node of claim 25, wherein at least one of said service card traffic manager and said line card traffic manager is adapted for indicating a backpressure condition if the amount of available space is less than a threshold determined to indicate capability of one of the egress queues to queue data from all ingress queues providing the data to that egress queue.

29. A method, comprising:
receiving at a destination queue within a node from a plurality of source queues, each source queue queuing data for one class of service;
tracking the amount of data for a plurality of classes of service entering and leaving the destination queue associated with an output port;
determining the amount of available space in said destination queue;
creating a message based at least in part on said determined amount of available space;
transmitting the message to a plurality of source queues providing data to said at least one destination queue; and
incrementally adjusting on a window-by-window basis bandwidth allocated to each of the plurality source queues for sending data to the destination queue based at least in part on whether the message indicates a backpressure condition, the backpressure condition being determined based on said amount of available space being less than a threshold determined to indicate capability of the destination queue to queue data from all source queues providing the data to the destination queue, and, for a particular one of the plurality of source queues, on utilization of bandwidth allocated to that source queue during a previous window and a class of service associated with that source queue.

30. A system for communicating a queue status, comprising:
means for tracking the amount of data for one or more classes of service entering and leaving at least one destination queue associated with an output port;
means for determining the amount of available space in said at least one destination queue;
means for creating a message based at least in part on said determined amount of available space;
means for transmitting said created message to a plurality of traffic managers, wherein each of said plurality of traffic managers has at least one source queue providing data to said at least one destination queue; and
means for indicating a backpressure condition if said amount of available space is less than a threshold determined to indicate capability of the destination queue to queue data from all source queues providing the data to the destination queue;
wherein each of the plurality of traffic managers allocates on a window-by-window basis bandwidth to each of the at least one of the plurality of source queues for sending data to the destination queue based at least in part on whether the message indicates a backpressure condition, the backpressure condition being determined based on said amount of available space being less than a threshold determined to indicate capability of the destination queue to queue data from all source queues providing the data to the destination queue, and, for a particular one of the plurality of source queues, on the utilization by that source queue of bandwidth allocated to it for sending data during a previous window and a class of service associated with that source queue.

31. The method of claim 29, wherein the bandwidth allocated to each of the plurality of source queues is changed between windows by an predetermined increment.

32. The method of claim 29, wherein the bandwidth allocated to one of the plurality of source queues is not incrementally adjusted to above a predetermined maximum bandwidth.

33. The method of claim 29, wherein the bandwidth allocated to one of the plurality of source queues is not incrementally adjusted to below a predetermined minimum bandwidth.

34. The method of claim 29, where in the bandwidth for one of the plurality of source queues for a current window is incrementally increased by a predetermined amount in the event that the message does not indicate backpressure and bandwidth allocated to the queue is fully utilized during a prior window.

35. The method of claim 29, wherein the bandwidth for one of the plurality of source queues for a current window is incrementally decreased by a predetermined amount in the event of either or both of two conditions: the message indicates backpressure or the bandwidth allocated to the queue was not fully utilized during a prior window.

* * * * *